United States Patent
Peters et al.

(10) Patent No.: US 9,997,038 B2
(45) Date of Patent: Jun. 12, 2018

(54) SMOKE DETECTION APPARATUS, METHOD FOR DETECTING SMOKE AND COMPUTER PROGRAM

(71) Applicant: Robert Bosch GmbH, Stuttgart (DE)

(72) Inventors: Bente Peters, Ottobrunn (DE); Anton Stadler, Bernau (DE)

(73) Assignee: Robert Bosch GmbH, Stuttgart (DE)

( * ) Notice: Subject to any disclaimer, the term of this patent is extended or adjusted under 35 U.S.C. 154(b) by 450 days.

(21) Appl. No.: 14/607,135

(22) Filed: Jan. 28, 2015

(65) Prior Publication Data

US 2015/0213698 A1 Jul. 30, 2015

(30) Foreign Application Priority Data

Jan. 29, 2014 (DE) .................. 10 2014 201 535

(51) Int. Cl.
  *G08B 17/00* (2006.01)
  *G08B 17/10* (2006.01)
  *H04N 7/18* (2006.01)
  *G08B 17/12* (2006.01)

(52) U.S. Cl.
  CPC ........... *G08B 17/10* (2013.01); *G08B 17/125* (2013.01); *H04N 7/183* (2013.01)

(58) Field of Classification Search
  CPC ............................... G08B 17/10; G08B 17/125

USPC ........................................................ 348/143
See application file for complete search history.

(56) References Cited

U.S. PATENT DOCUMENTS

| | | |
|---|---|---|
| 4,614,968 A | 9/1986 | Rattman et al. |
| 8,497,904 B2 | 7/2013 | Jelinek et al. |
| 2011/0050894 A1* | 3/2011 | Jelinek ................. G08B 17/125 348/143 |

\* cited by examiner

*Primary Examiner* — Jeffery Williams
(74) *Attorney, Agent, or Firm* — Michael Best & Friedrich LLP

(57) ABSTRACT

A smoke detection apparatus 1 is proposed, the smoke detection apparatus 1 being able to be connected to at least one monitoring camera 2 which is designed to record images of a monitoring area, the monitoring area comprising at least one stationary contrast pattern object 3, having an evaluation device 5, the evaluation device 5 being designed to detect the at least one contrast pattern object 3 in the images transmitted by the monitoring camera 2, the evaluation device 5 evaluating a change in the contrast pattern object 3 in the images as at least one smoke detection feature in order to detect smoke, the evaluation device 5 being designed to evaluate a contrast deviation between an upper contrast pattern section 4a and a lower contrast pattern section 4b of the at least one contrast pattern object 3 in at least one of the images as the at least one smoke detection feature.

13 Claims, 3 Drawing Sheets

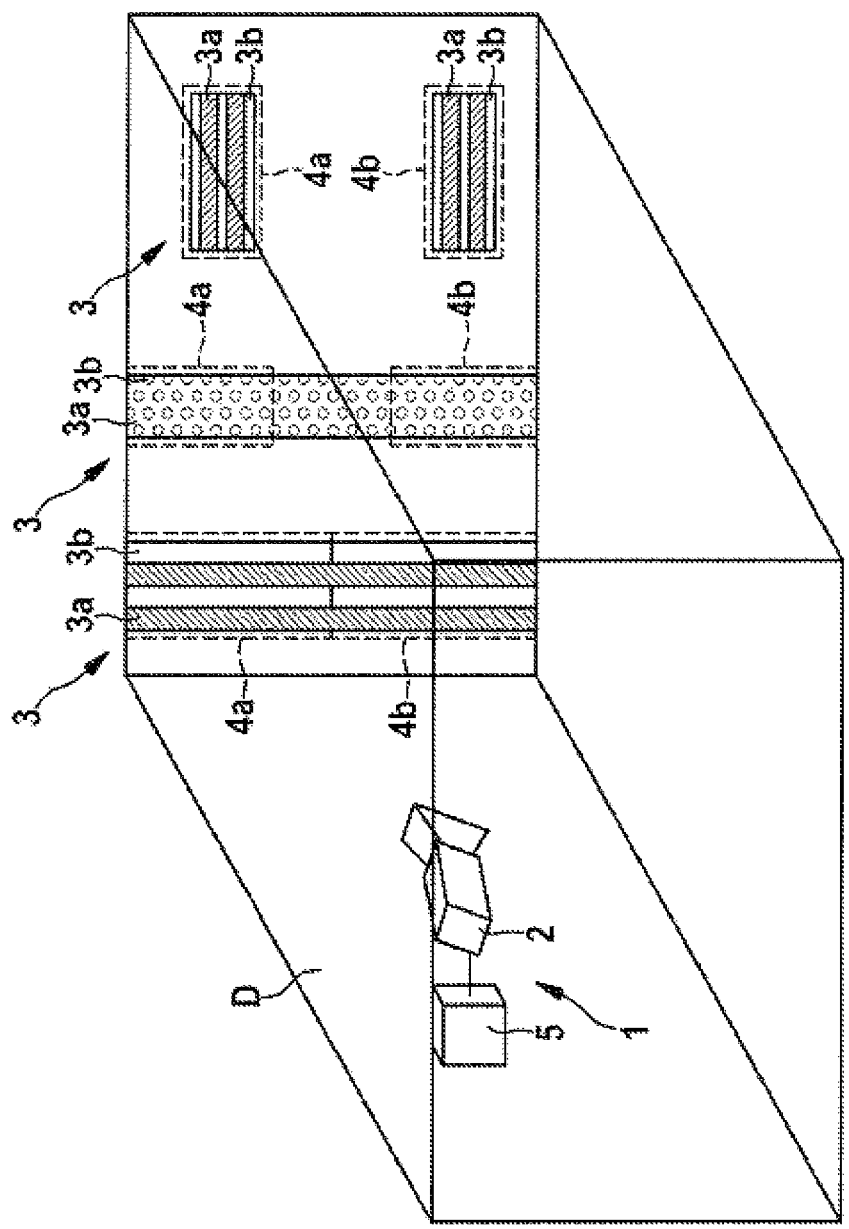

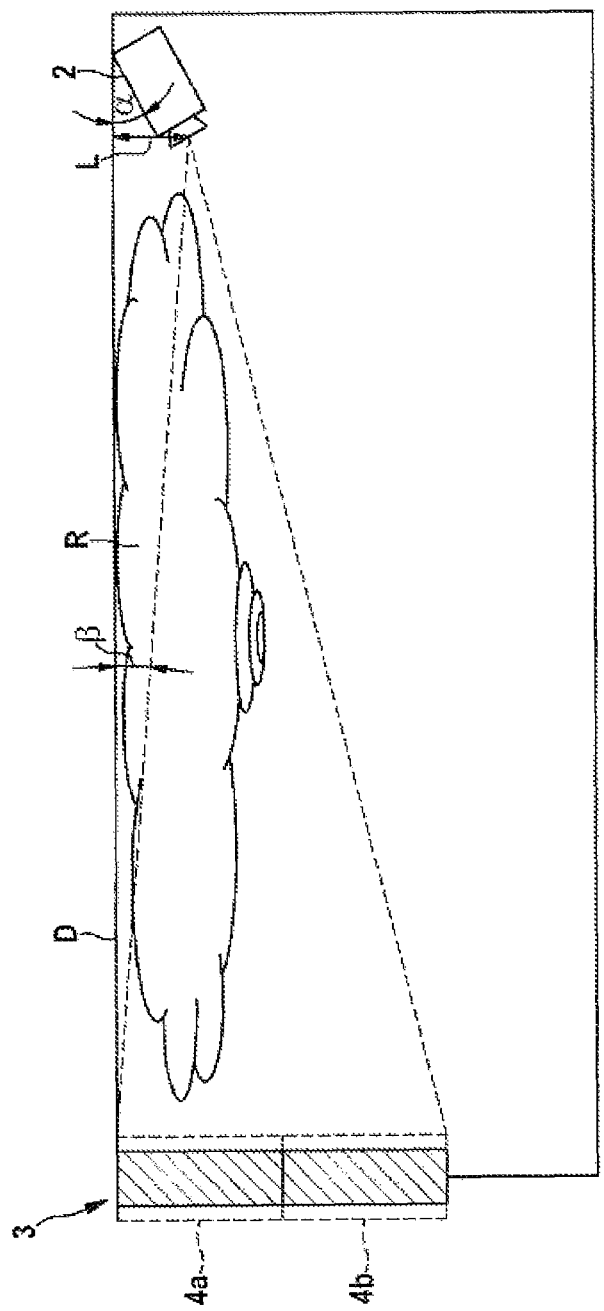

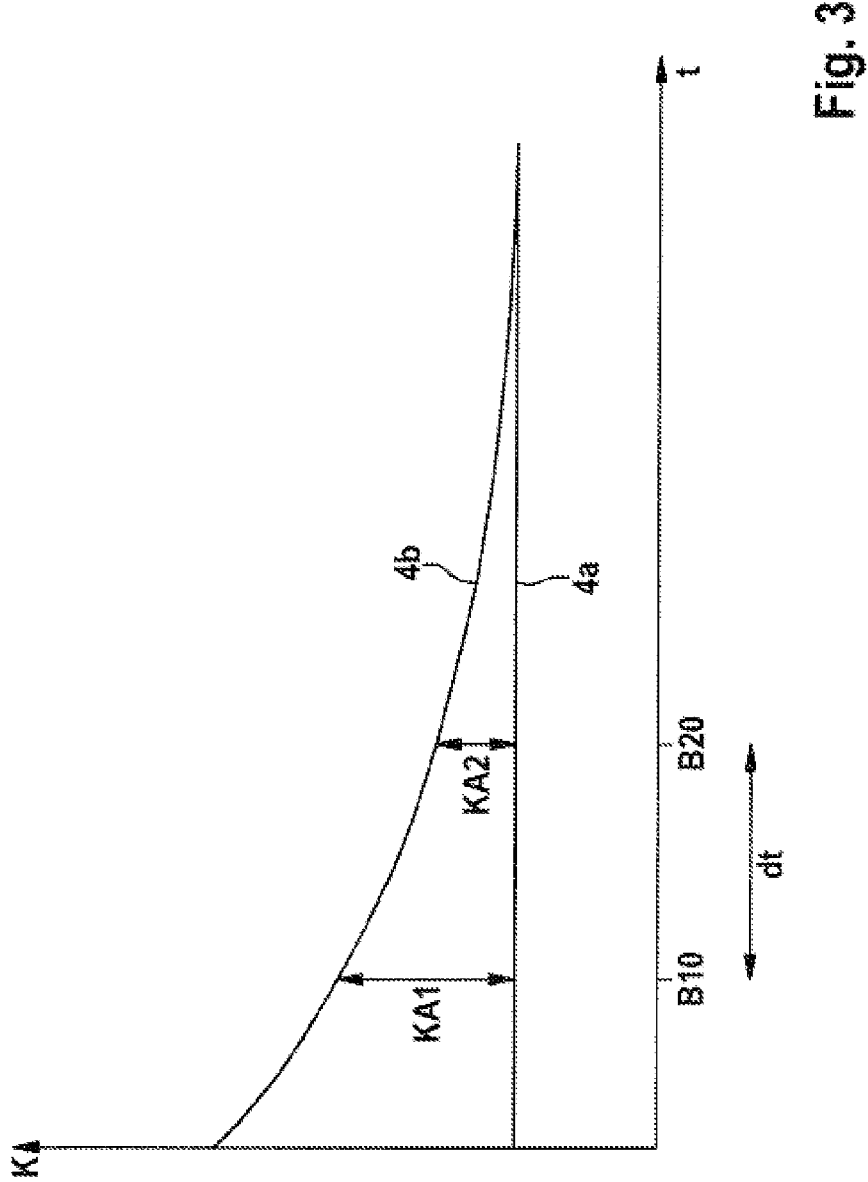

SMOKE DETECTION APPARATUS, METHOD FOR DETECTING SMOKE AND COMPUTER PROGRAM

BACKGROUND OF THE INVENTION

The invention relates to a smoke detection apparatus. The invention also relates to a method for detecting smoke and to a corresponding computer program.

Smoke detection devices are used to detect smoke and to trigger an alarm in the event of a detected fire. In order to detect the smoke, particular characteristic variables, for example temperature or density of smoke particles, are measured. The availability of image sensors also makes it possible for smoke detection devices to be operated with video cameras for the purpose of detecting the smoke.

The document U.S. Pat. No. 8,497,904 B2, for example, which probably forms the closest prior art describes a smoke detector having circuits which are coupled to a camera. The field of vision of the camera comprises one or more targets each with spatial indices thereon. The circuits collect spatial frequency measurements, for example parameters which indicate contrast.

SUMMARY OF THE INVENTION

The scope of the invention proposes a smoke detection apparatus, a method and a computer program The invention therefore proposes a smoke detection apparatus for detecting smoke. For example, the smoke detection apparatus is intended to be arranged in private installations, public areas or industrial environments in order to detect smoke in good time and to output a smoke alarm. The smoke detection apparatus should be or is particularly preferably arranged in closed or half-closed premises, for example in warehouses, industrial plants, roofed areas or office spaces.

The smoke detection apparatus can be or is connected to at least one monitoring camera which is designed to record images of a monitoring area. The smoke detection apparatus optionally comprises the at least one monitoring camera. The monitoring camera is particularly preferably designed to record images in the VIS range. The at least one monitoring camera may be in the form of a CCD camera or a CMOS camera or may have another design, for example. The monitoring area may be, for example, rooms or room sections in a building or else outdoor areas in an environment.

The monitoring area comprises at least one stationary contrast pattern object. In particular, the stationary contrast pattern object is permanently arranged in the monitoring area in terms of its position. In particular, the at least one contrast pattern object comprises or forms a contrast pattern. The contrast pattern preferably has at least two contrast areas which form a contrast in the contrast pattern. The contrast indicates, in particular, the difference in brightness and/or the difference in color between the at least two contrast areas. In particular, the contrast is greater, the greater the difference in brightness and/or the difference in color between the at least two contrast areas. The at least two contrast areas preferably differ in terms of color, for example by at least one light-colored and dark-colored contrast area. The contrast of the contrast pattern is particularly preferably formed by at least one white contrast area and one black contrast area, with the result that the contrast pattern object comprises or forms a black-and-white contrast pattern. In this manner, there is a maximum difference in brightness between the at least two contrast areas. Consequently, the individual contrast areas can be distinguished from one another and the contrast pattern is therefore implemented with high contrast.

The monitoring camera in the monitoring area preferably focuses a section in which at least sections of the at least one contrast pattern object are arranged. In this case, provision is made, in particular, for the contrast pattern object, in particular the contrast pattern of the contrast pattern object, to be able to be discerned in the images from the monitoring camera.

The smoke detection apparatus comprises an evaluation device, the evaluation device being suitable and/or designed to detect the at least one contrast pattern object in the images which can be or are transmitted by the monitoring camera. The evaluation device is particularly preferably designed to discern, in particular detect, the contrast pattern object, in particular the contrast pattern of the contrast pattern object. In order to transmit the images, the at least one monitoring camera can be or is connected to the evaluation device using data technology. The data transmission of the images is preferably carried out using a network. The network may be a wired network, for example a LAN, or a wireless network, for example a WLAN. However, it is also possible for the network or at least one section of the transmission path in the network to be in the form of a public network, in particular an Internet. For example, the evaluation device is in the form of a digital data processing device, in particular a computer.

In order to detect smoke, the evaluation device is designed to determine a contrast of the contrast pattern object, in particular of the contrast pattern of the contrast pattern object, in the images and to evaluate it as at least one smoke detection feature. The at least one smoke detection feature is, in particular, an indicator for the presence of smoke in the monitoring area. The evaluation device is designed to detect the smoke on the basis of the at least one evaluated smoke detection feature.

The evaluation device is preferably designed to output the smoke alarm when smoke is detected. The smoke alarm may be a smoke alarm message to a control center, for example. Alternatively or optionally additionally, the smoke detection apparatus comprises an alarm device which is designed, for example, to output an acoustic and/or optical alarm signal as the smoke alarm when smoke is detected.

The scope of the invention proposes that the evaluation device is designed to determine a contrast deviation, in particular a difference in contrast, between an upper contrast pattern section and a lower contrast pattern section of the at least one contrast pattern object in at least one of the images and to evaluate the contrast deviation as the at least one smoke detection feature. In particular, the contrast pattern object has a first contrast deviation when smoke is not present and has a second contrast deviation when smoke is present, with the result that the presence of smoke can be inferred by determining the contrast deviation. For example, the first contrast deviation is recorded as a reference value, a limit value is defined on the basis of the reference value and contrast deviations subsequently determined are compared with the limit value in order to evaluate the contrast deviation as a smoke detection feature. Alternatively, a user can also input a limit value.

The upper contrast pattern section is preferably superordinate to the lower contrast pattern section in a height profile. In particular, the height profile should be understood as meaning the extent from a floor to a ceiling of the monitoring area. When smoke is present, the contrast patterns of the upper and lower contrast pattern sections have highly different contrasts from one another in the at least one image. In particular, when smoke is present, the contrast pattern of the upper contrast pattern section has a lower contrast than the contrast pattern of the upper contrast pattern section in the images.

The invention is based on the consideration that the presence of smoke reduces the contrast in images of the contrast pattern object since the images of the contrast pattern object are "washed out". Since smoke generally rises upward, it initially accumulates in an upper section of the monitoring area, in particular directly in the vicinity of the ceiling or roof of the room, whereas there is still no or only relatively slight accumulation of smoke in the lower section of the monitoring area. It follows from this that a reduction in the contrast in the images can first be detected in the upper contrast pattern section, whereas still no or at least only a relatively slight reduction in the contrast can be detected in the lower contrast pattern section. The evaluation of the contrast deviation between the two contrast pattern sections therefore makes it possible to detect the characteristic smoke development behavior described above and qualifies the contrast deviation as a smoke detection feature. Optionally additionally, the saturation and/or the brightness in the images of the contrast pattern sections can be compared in addition to the contrast and the results can be used as a further smoke detection feature.

Furthermore, the evaluation of the contrast deviation achieves, at least as far as possible, a low-error distinction between smoke and deception variables since the change in the contrasts can be caused by the deception variables only with difficulty. Objects and processes which simulate smoke detection features and can therefore inadvertently trigger a smoke alarm even though there is actually no risk are referred to as deception variables. Deception variables may be, for example, persons walking past or changing lighting conditions. The contrast deviation between the upper and lower contrast pattern sections is particularly preferably evaluated in real time.

In order to determine the contrast deviation, it is preferred to determine the contrasts of the contrast patterns of the upper and lower contrast pattern sections. The determined contrasts are preferably compared with one another, in particular related to one another. For example, the comparison is based on a quotient of the determined contrasts of the contrast patterns of the upper and lower contrast pattern sections. Forming the quotient makes it possible to quantify the contrast deviation between the contrast pattern sections. For example, a ratio of 1:1 shows the same contrast, whereas a ratio of 5:1 or 1:5, for example, constitutes a considerable contrast deviation. Alternatively, a difference between the contrasts can also be used to quantify the contrast deviation.

One particularly preferred embodiment provides for the evaluation device to be designed to evaluate a decrease in contrast from the lower contrast pattern section to the upper contrast pattern section of the at least one contrast pattern object as a contrast deviation in at least one or precisely one of the images as the at least one smoke detection feature, in particular as a further smoke detection feature. In this preferred embodiment, the evaluation device therefore checks whether the contrast of the contrast pattern object decreases from the bottom upward in the image. The evaluation device is particularly preferably designed to interpret the decrease in contrast as a smoke detection feature when a lower contrast in the upper contrast pattern section than in the lower contrast pattern section is detected. In order to detect the decrease in contrast, the contrasts respectively determined in one of the images are preferably compared with one another. The recorded decrease in contrast can be compared, for example, with a model of a decrease in contrast in order to detect smoke by the decrease in contrast as the smoke detection feature. The evaluation of the decrease in contrast from the lower contrast pattern section to the upper contrast pattern section proves to be particularly advantageous since the characteristic smoke development behavior described above is used as a smoke detection feature. Consequently, the smoke detection reliability is increased by the preferred embodiment.

On account of the fact that the smoke continues to accumulate in the upper section of the monitoring area, the contrasts in the images of the upper and lower contrast pattern sections match one another over time. Therefore, the evaluation device first of all determines a large contrast deviation which becomes smaller over time. The matching of the contrasts of the upper and lower contrast pattern sections in the images from the monitoring camera and therefore the reduction in the contrast pattern deviation over time can be referred to as a contrast approach. This smoke development profile can therefore be seen in the images by a contrast approach starting from the contrast deviation caused by smoke. Against this background, it is preferred for the evaluation device to be designed to evaluate a contrast approach of the upper and lower contrast pattern sections as the at least one smoke detection feature in at least two of the images starting from the contrast deviation, in particular starting from the decrease in contrast, in order to detect smoke. In particular, in order to evaluate the contrast approach, the detected contrast deviation is compared with, in particular related to, at least one subsequent detected contrast deviation, the contrast deviation being reduced in the contrast approach. The contrast approach determined in this manner can be compared with a model of a contrast approach or with predefinable limit values in order to interpret it as a smoke detection feature. The evaluation of the contrast approach therefore checks the spreading of smoke, which characteristically runs downward, and is consequently a reliable smoke detection feature.

Since the smoke does not spread suddenly from the upper contrast pattern section to the lower contrast pattern section, but rather with a time delay, the contrast approach also does not take place abruptly, but rather within a particular time window. Therefore, it is particularly preferred for the evaluated contrast approach to be verified as the at least one smoke detection feature by means of a predefined time window. For the purpose of verification, it is preferred for the predefined time window to be compared with a detected time of the contrast approach. The detected time is, for example, the time which has elapsed before the contrast deviation changes by a predefinable value.

The evaluated contrast approach is verified if the detected time is within the predefined time window. The evaluated contrast approach is rejected as a deception variable if the detected time exceeds or undershoots the predefined time window. For example, the predefined time window is at least five seconds, in particular at least ten seconds and/or at most 180 seconds, in particular at most 100 seconds. The temporal verification verifies, in particular, the speed profile of the contrast approach and consequently the speed profile of the spreading of smoke from the upper contrast pattern section to the lower contrast pattern section. The time-dependent verification of the contrast approach excludes contrast approaches which take place too quickly, in particular abrupt contrast approaches, and/or contrast approaches which take place too slowly, and therefore a multiplicity of deception variables. Reliable smoke detection is consequently implemented.

The contrast of the contrast patterns is evaluated, for example, by detecting a number of contrast areas in the contrast patterns which are visible or can be distinguished in the at least one image. Detection is carried out, in particular, by counting the contrast areas which are in the form of lines, circles, rectangles or the like, for example. The contrast of the contrast patterns is determined as a numerical value using the number of detected contrast areas. In particular, the numerical values of the contrast patterns of the upper and lower contrast pattern sections are compared with one another as contrasts in order to evaluate the contrast deviation, in particular the decrease in contrast. The contrast patterns of the upper and lower contrast pattern sections preferably have the same number and/or form of contrast areas, thus enabling a simple and fast comparison.

Alternatively or optionally additionally, the contrast is evaluated by detecting an edge contrast. The edge contrast is detected, for example, by detecting the differences in brightness of transitions of the at least two contrast areas. The contrast of the contrast patterns is determined using the detected differences in brightness between the at least two contrast areas. In particular, the differences in brightness of the contrast patterns of the upper and lower contrast pattern sections are compared with one another as contrasts in order to evaluate the contrast deviation, the decrease in contrast and/or the contrast approach. The contrast patterns of the upper and lower contrast pattern sections preferably have the same gradient of the brightness profile at light/dark contour edges, thus enabling a simple and fast comparison.

In closed rooms in particular, there are usually scarcely noticeable wind conditions, with the result that the smoke rises steeply upward, in particular in the height profile of the two contrast pattern sections, especially in the vertical direction to the floor and/or ceiling or roof. Therefore, it is particularly preferred for the evaluation device to evaluate the contrast deviation, in particular the decrease in contrast from the lower contrast pattern section to the upper contrast pattern section in the height profile, in particular in the vertical direction to the floor and/or ceiling or roof, as the at least one smoke detection feature. A vertical decrease in contrast is therefore evaluated, in particular. For this purpose, at least sections of the upper and lower contrast pattern sections are arranged in a manner aligned with one another in the vertical direction.

In one possible implementation of the invention, the smoke detection apparatus comprises the at least one stationary contrast pattern object. For example, the at least one stationary contrast pattern object is a natural contrast pattern object such as an indoor plant or a cupboard. However, it is particularly preferred for the at least one stationary contrast pattern object to be in the form of an artificial contrast pattern object. The artificial contrast pattern object may be, for example, a one-piece or multi-piece contrast pattern board, film, wallpaper and/or a wall provided with patterns.

It is particularly preferred for the upper and lower contrast pattern sections of the contrast pattern object, in particular of the contrast pattern board, to have the same contrast patterns. The same contrast patterns should be understood as meaning, in particular, contrast patterns having the same color, the same color saturation, the same form, size and/or number of contrast areas. The same design of the contrast patterns makes it possible to compare the contrasts and therefore evaluate the contrast deviation in a simple and reliable manner.

In one preferred development, the contrast patterns of the upper and/or lower contrast pattern section have precisely one pattern profile in the vertical direction. Precisely one pattern profile should be understood as meaning a contrast pattern having at least two contrast areas which can be distinguished and run in the vertical direction. For example, the contrast pattern having the precisely one pattern profile is in the form of a vertically running line pattern. Alternatively or optionally additionally, the contrast patterns of the upper and/or lower contrast pattern section have the same pattern profiles which are repeated in the vertical direction. For example, the same pattern profiles which are repeated in the vertical direction are in the form of horizontally running line patterns or chessboard patterns. The uniformity of the contrast patterns makes it possible to reliably detect the contrasts in the images and therefore to evaluate the contrast deviation and the decrease in contrast.

The contrast pattern object can be manually detected in the images, for example. The contrast pattern object is marked, for example, by a user on a screen on which the images of the monitoring area are displayed. Alternatively or optionally additionally, the at least one contrast pattern object can be detected in the images by automatically detecting the contrast pattern object by means of the evaluation device. The automatic detection can be optionally verified by the user.

The invention also relates to a smoke detection arrangement having the smoke detection apparatus according to the preceding description. In particular, the smoke detection arrangement comprises the at least one contrast pattern object, the at least one contrast pattern object being arranged in a stationary manner in the monitoring area. The upper contrast pattern section, in particular an upper edge of the contrast pattern section, is preferably arranged at a distance of less than one meter from the ceiling. On the one hand, the accumulation of smoke in the vicinity of the ceiling can therefore be evaluated. Since the smoke also first of all accumulates in the vicinity of the ceiling, prompt evaluation of the smoke densification is implemented, on the other hand.

The invention also relates to a method for detecting smoke using a smoke detection arrangement and/or a smoke detection apparatus according to the preceding description. In particular, the evaluation device of the smoke detection apparatus detects the at least one contrast pattern object in the images, the evaluation device evaluating the contrast deviation between the upper contrast pattern section and the lower contrast pattern section of the at least one contrast pattern object as the at least one smoke detection feature in order to detect smoke.

The invention also relates to a computer program having program code means .

BRIEF DESCRIPTION OF THE DRAWINGS

Further features, advantages and effects of the invention emerge from the following description of preferred exemplary embodiments of the invention and the accompanying figures. In the figures:

FIG. 1 shows the schematic three-dimensional illustration of a smoke detection apparatus as an exemplary embodiment of the invention;

FIG. 2 shows the schematic illustration of the smoke detection in a monitoring area by the smoke detection apparatus;

FIG. 3 shows a graph for illustrating possible evaluation of a contrast approach by an evaluation device of the smoke detection apparatus from FIG. 1.

DETAILED DESCRIPTION

FIG. 1 shows a smoke detection apparatus 1 which is designed to detect smoke in a monitoring area. The smoke detection apparatus 1 is suitable, in particular, for use in closed or half-closed rooms with a roof or ceiling D.

The smoke detection apparatus 1 is connected, by means of data technology, to a monitoring camera 2 which is designed to record images of the monitoring area. The smoke detection apparatus 1 optionally comprises the monitoring camera 2. In this exemplary embodiment, the monitoring area recorded by the monitoring camera 2 is at least one section of the schematically illustrated room.

The monitoring area of the monitoring camera 2 has at least one stationary contrast pattern object 3. This exemplary embodiment shows a plurality of stationary contrast pattern objects 3 which are exemplary embodiments of the at least one stationary contrast pattern object 3. The stationary contrast pattern objects 3 are arranged on a wall of the illustrated room, but a free-standing arrangement in the room may also be provided. In this exemplary embodiment, the stationary contrast pattern objects 3 shown are each an artificial contrast pattern object 3. The artificial contrast pattern objects 3 are contrast pattern boards. Alternatively or optionally additionally, natural contrast pattern objects 3 such as doors, windows or stock in the monitoring area are possible. The two stationary contrast pattern objects 3 seen from the left extend in a height profile from the floor to the ceiling. The right-hand contrast pattern object 3 is divided into two in the height profile.

The at least one contrast pattern object 3 comprises an upper contrast pattern section 4*a* and a lower contrast pattern section 4*b*. For example, precisely one contrast pattern object 3 comprises the contrast pattern sections 4*a*, 4*b*, as is respectively illustrated for the two contrast pattern objects 3 arranged on the left. In this case, it is possible for the contrast pattern sections 4*a*, 4*b* to completely form the contrast pattern object 3, as is illustrated in the contrast pattern object 3 arranged on the left. Alternatively, it is likewise possible for the contrast pattern sections 4*a*, 4*b* to form only sections of the contrast pattern object 3, as is illustrated in the contrast pattern object 3 arranged in the center. Alternatively, the contrast pattern sections 4*a*, b are at a distance from one another, as is illustrated in the right-hand contrast pattern object 3.

The upper contrast pattern section 4*a* is arranged in the upper section of the monitoring area. For example, the upper contrast pattern section 4*a*, in particular a horizontal upper edge of the upper contrast pattern section 4*a*, is arranged at a distance of less than one meter from the roof or ceiling D. The lower contrast pattern section 4*b* is arranged in the lower section of the monitoring area. For example, the lower contrast pattern section 4*b*, in particular a horizontal lower edge of the lower contrast pattern section 4*b*, is arranged at a distance of less than one meter from the floor. The distance between the contrast pattern sections 4*a*, 4*b* is between 0 and 5 meters, for example.

The contrast patterns of the contrast pattern sections 4*a*, 4*b* each have a plurality of contrast areas 3*a*, 3*b* which form a contrast as a result of their ability to be distinguished, in particular their difference in brightness. The areas 3*a*, 3*b* each form specific pattern profiles in the contrast patterns. The contrast pattern of the left-hand contrast pattern object 3 has precisely one pattern profile in the vertical direction, namely a vertically running line pattern. The central contrast pattern object 3 has the same pattern profiles which are repeated in the vertical direction, circles in this example. The contrast patterns of the right-hand contrast pattern object 3 each have the same pattern profiles which are repeated in the vertical direction, namely horizontally running line patterns.

The areas 3*a*, 3*b* may have different colors, for example red, blue, green, different shades of gray, black and/or white.

The smoke detection apparatus 1 comprises an evaluation device 5 which detects the contrast pattern object 3 and the contrast pattern sections 4*a*, 4*b* of the contrast pattern object 3 in the images transmitted by the monitoring camera 2. For example, the contrast pattern object 3 and/or the contrast pattern sections 4*a*, 4*b* is/are detected by means of manual marking on a screen on which the images of the monitoring area are displayed.

The evaluation device 5 is designed to evaluate a contrast deviation of the contrast patterns between the upper and lower contrast pattern sections 4*a*, 4*b* in at least one or precisely one of the images. In the case of the contrast deviation, the contrast patterns of the upper and lower contrast pattern sections 4*a*, 4*b* have different contrasts from one another in the at least one of the images.

As can be readily seen in FIG. 2, rising smoke R first of all accumulates in the vicinity of the ceiling D, with the result that a higher smoke density in the vicinity of the ceiling than in the vicinity of the floor can be recorded at the beginning of smoke development. In order to use the knowledge of smoke development as a priori knowledge when detecting smoke, the evaluation device 5 is designed to evaluate a contrast deviation of the contrast patterns from the lower contrast pattern section 4*b* to the upper contrast pattern section 4*a* in at least one or precisely one of the images and to use it as a smoke detection feature. Even a significant, absolute difference in the contrasts between the upper and lower contrast pattern sections 4*a*, *b* in the images from the monitoring camera 2 is a meaningful fire detection feature.

As a result of the accumulation of smoke in the upper section, the contrast pattern of the upper contrast pattern section 4*a* has a lower contrast than the contrast pattern of the lower contrast pattern section 4*b* in the images from the monitoring camera 2. Therefore, the evaluation device 5 is designed, for example, to evaluate a decrease in contrast, when a lower contrast in the upper contrast pattern section 4*a* than in the lower contrast pattern section 4*b* is detected, as a smoke detection feature in the at least one image. The detection of the contrast deviation, in particular the decrease in contrast, forms a reliable smoke detection feature for detecting smoke.

As the smoke continues to develop, the smoke accumulates at the ceiling and spreads from the upper section to the lower section of the monitoring area, with the result that the contrast deviation is increasingly reduced in the subsequent images and consequently a contrast approach of the two contrast pattern sections 4*a*, 4*b* takes place. In order to detect this characteristic spreading of smoke as a further smoke detection feature, the evaluation device 5 is designed to evaluate at least one contrast approach of the upper and lower contrast pattern sections 4*a*, 4*b* as the at least one smoke detection feature in at least two of the images starting from the contrast deviation, in particular starting from the decrease in contrast. This makes it possible to exclude deception variables, for example persons walking past, and to consequently at least reduce false alarms. The evaluation of the contrast approach provides another reliable smoke detection feature for detecting smoke.

FIG. 3 shows a graph of possible evaluation of the contrast approach. The time t is plotted on the x axis of the graph and the evaluated contrast K for the contrast pattern sections 4*a*, 4*b* is plotted as a measured value on the y axis. Recorded images B10 and B20 are entered along the time axis as an example.

The evaluation device 5 is designed to evaluate the contrast deviation between the upper contrast pattern section 4*a* and the lower contrast pattern section 4*b* in the images B10, B20. If the contrast monitoring determined in this manner exceeds a predefinable limit value, this forms the at least one smoke detection feature. The contrast deviation is also detected as a decrease in contrast KA1, KA2 if the contrast K of the upper contrast pattern section 4*a* is lower than that of the lower contrast pattern section 4*b*. The decrease in contrast forms another smoke detection feature.

The evaluation device 5 is designed to evaluate a contrast approach of the upper and lower contrast pattern sections 4*a*, 4*b* in at least two of the images B10, B20 starting from the decrease in contrast KA1. In order to evaluate the contrast approach, the detected contrast deviation KA1 is compared with at least one subsequent detected contrast deviation KA2. The contrast approach is detected by detecting a contrast deviation KA2 which is reduced in comparison with the contrast deviation KA1. The contrast approach forms another smoke detection feature.

Since the smoke spreads from the upper section to the lower section of the monitoring area and the contrast approach therefore takes place in a particular time window, it is possible for the evaluated contrast approach to be verified by a predefined time window. For the purpose of verification, the predefined time window is compared with the detected time dt of the contrast approach, that is to say with the time dt between the evaluated contrast deviations KA1, KA2. For example, the predefined time window is at least five seconds and/or at most 180 seconds. The evaluated contrast approach is verified if the detected time dt is within the predefined time window. The evaluated contrast approach is rejected if the detected time dt exceeds or undershoots the predefined time window. The time-dependent verification of the contrast approach helps to separate deception variables, for example the persons walking past or slowly changing lighting conditions, from actual smoke situations.

As can be readily seen in FIG. 2, the monitoring camera 2 is arranged on the ceiling D of the room. In this manner, the field of vision promptly includes the accumulation of smoke in the vicinity of the ceiling. Arranging the upper contrast pattern section 4*a* in the vicinity of the ceiling makes it possible to monitor a large area of smoke accumulation and smoke spreading with only one monitoring camera 2.

For an optimal viewing direction of the monitoring camera 2 and therefore the greatest possible coverage of the monitoring area, a tilt angle alpha between the ceiling D and a viewing direction or optical axis of the monitoring camera 2 is stipulated, for example. The distance angle alpha is below 25°, for example. Alternatively or optionally additionally, a length L from the ceiling D to an end section of the monitoring camera 2 is stipulated. Alternatively or optionally additionally, a distance angle beta between the ceiling D and an upper length profile of the field of vision of the monitoring camera 2 is stipulated.

The invention claimed is:

1. A smoke detection apparatus (1),
 the smoke detection apparatus (1) configured to connect to at least one monitoring camera (2) which is configured to record images of a monitoring area, the monitoring area comprising at least one stationary contrast pattern object (3), the smoke dectection apparatus (1) including an evaluation device (5)configured to detect the at least one contrast pattern object (3) in images transmitted by the monitoring camera (2), the evaluation device (5) evaluating a contrast of the contrast pattern object (3) in the images as at least one smoke detection feature in order to detect smoke,
 wherein
 the evaluation device (5) is configured to determine a contrast deviation between an upper section (4*a*) and a lower section (4*b*) of the at least one contrast pattern object (3) in at least one of the images and to evaluate the contrast deviation as the at least one smoke detection feature, and to output a smoke alarm when the evaluation device (5) detects smoke.

2. The smoke detection apparatus (1) according to claim 1, wherein the evaluation device (5) is configured to evaluate a decrease in contrast from the lower contrast pattern section (4*b*) to the upper contrast pattern section (4*a*) of the at least one contrast pattern object (3) as a contrast deviation in at least one of the images as the at least one smoke detection feature.

3. The smoke detection apparatus (1) according to claim 1, wherein the evaluation device (5) is configured to evaluate at least one contrast approach of the upper and lower contrast pattern sections (4*a*, 4*b*) starting from the contrast deviation in at least two of the images as the at least one smoke detection feature.

4. The smoke detection apparatus (1) according to claim 1, wherein the evaluation device (5) evaluates the contrast deviationof the decrease in contrast from the lower contrast pattern section (4*b*) to the upper contrast pattern section (4*a*) in the vertical direction, as the at least one smoke detection feature.

5. The smoke detection apparatus (1) according to claim 1, wherein the smoke detection apparatus (1) includes the contrast pattern object.

6. The smoke detection apparatus (1) according to claim 5, wherein the contrast patterns of the upper and lower contrast pattern sections (4*a*, 4*b*) have exactly one pattern course and/or identical repeating pattern courses in the vertical direction.

7. The smoke detection apparatus (1) according to claim 6, wherein the at least one contrast pattern object (3) is in the form of a contrast pattern board, the upper and lower contrast pattern sections (4*a*, 4*b*) of the contrast pattern board having the same contrast patterns.

8. The smoke detection apparatus (1) according to claim 1, wherein the at least one contrast pattern object (3) is detected in the images by automatically detecting the contrast pattern object (3) by the evaluation device (5).

9. The smoke detection arrangement having the smoke detection apparatus (1) according to claim 1, wherein the smoke detection arrangement includes the at least one contrast pattern object (3), the at least one contrast pattern object (3) being arranged in a stationary manner in the monitoring area.

10. The smoke detection arrangement according to claim 9, wherein the upper contrast pattern section (4*a*) is arranged at a distance of less than one meter from a ceiling (D) of the monitoring area.

11. A method for detecting smoke using a smoke detection apparatus (1) according to claim 1, an evaluation device (5) of the smoke detection apparatus (1) detecting at least one contrast pattern object (3) in images, the evaluation device (5) evaluating a contrast deviation between an upper contrast pattern section (4*a*) and a lower contrast pattern section (4*b*) of the at least one contrast pattern object (3) as a at least one smoke detection feature (3) in order to detect smoke, and outputting a smoke alarm when the evaluation device (5) detects smoke.

12. A non-transitory computer readable medium having program code for carrying out all steps of the method according to claim 11 when the program is executed on a computer.

13. A non-transitory computer readable medium having program code for carrying out all steps of the method according to claim 11 when the program is executed on the smoke detection apparatus (1).

* * * * *